US010813364B2

(12) United States Patent
Zomerdijk et al.

(10) Patent No.: US 10,813,364 B2
(45) Date of Patent: Oct. 27, 2020

(54) INTESTINES PROCESSING SYSTEM AND METHOD FOR PROCESSING AN INTESTINES PACKAGE

(71) Applicant: Meyn Food Processing Technology B.V., Oostzaan (NL)

(72) Inventors: Hermanus Laurentius Zomerdijk, Oostzaan (NL); Evert Kikstra, Oostzaan (NL); Derek Raymond Dil, Oostzaan (NL)

(73) Assignee: Meyn Food Processing Technology B. V., Oostzaan (NL)

( * ) Notice: Subject to any disclaimer, the term of this patent is extended or adjusted under 35 U.S.C. 154(b) by 0 days.

(21) Appl. No.: 16/541,314

(22) Filed: Aug. 15, 2019

(65) Prior Publication Data
US 2020/0054030 A1 Feb. 20, 2020

(30) Foreign Application Priority Data

Aug. 20, 2018 (NL) ..................................... 2021483

(51) Int. Cl.
*A22C 17/14* (2006.01)
*A22C 17/00* (2006.01)
*A22C 21/00* (2006.01)

(52) U.S. Cl.
CPC .......... *A22C 17/14* (2013.01); *A22C 17/0093* (2013.01); *A22C 21/0053* (2013.01)

(58) Field of Classification Search
CPC ........... A22B 5/08; A22C 17/00; A22C 17/14; A22C 17/16

USPC .......................................... 452/106, 111, 112
See application file for complete search history.

(56) References Cited

U.S. PATENT DOCUMENTS

| 3,707,019 A  * | 12/1972 | Wiggins ............... A22C 25/145 |
| | | 452/110 |
| 5,041,053 A | 8/1991 | Ellis et al. |
| 5,152,715 A | 10/1992 | van de Eerden et al. |
| 5,186,680 A  * | 2/1993 | Conaway ........... A22C 21/0092 |
| | | 452/111 |
| 5,549,521 A | 8/1996 | van den Nieuwelaar et al. |
| 6,638,155 B2 * | 10/2003 | Jensen .................. A22B 5/0005 |
| | | 452/106 |
| 2016/0095327 A1* | 4/2016 | Thrane ................... A22C 21/06 |
| | | 452/111 |

OTHER PUBLICATIONS

Search Report and Written Opinion for corresponding Application No. NL 2021483, dated Aug. 20, 2018, 18 pages.

* cited by examiner

*Primary Examiner* — Richard T Price, Jr.
(74) *Attorney, Agent, or Firm* — Dority & Manning, P.A.

(57) ABSTRACT

An intestines processing system and method including a conveyor track with carriers, a tissue breaking section and a gallbladder removal station. The carrier can be equipped to move the intestines package through the tissue breaking section for breaking at least some of the tissue connections in the intestines package below the gallbladder, and to move the intestines package through the gallbladder removal station for removing the gallbladder from the remainder of the intestines package.

22 Claims, 6 Drawing Sheets

INTESTINES PROCESSING SYSTEM AND METHOD FOR PROCESSING AN INTESTINES PACKAGE

PRIORITY STATEMENT

The present application claims priority under 35 U.S.C. § 119 to Dutch Application No. 2021483, filed Aug. 20, 2018.

FIELD OF THE INVENTION

The subject matter of the present disclosure relates to an intestines processing system and processing method for the intestines package of poultry.

BACKGROUND OF THE INVENTION

Conventionally, an intestines package may be first taken through an intestines stretcher section, wherein the intestines are pulled down by a roller so that the gizzard and the liver are on top and the remainder of the intestines package is suspended thereunder. The intestines package may then be taken through a gallbladder removal station while suspended from a carrier for the intestines package. During movement of the intestines package, the gizzard is turned by a guide so that the liver comes to lie on the back of the intestines package as it arrives into a gallbladder positioning section. In the gallbladder positioning section, the gallbladder is positioned between further guides by pulling the intestines, and the gallbladder is then caught between plates and sucked down by a vacuum system. Thereafter a cutting tool is used to sever the gallbladder from the remainder of the intestines.

Such conventional system and method suffers from several disadvantages and problems. One of the problems is that the liver may be damaged. Another problem is that the gallbladder positioning section is not particularly accurate, resulting in a low score on reliability in the removal of the gallbladder. Practical results of the known system and method reveal that approximately 15% remaining gallbladders may be expected in the known system and method. Also the cutting tool that is used for severing the gallbladder from the remainder of the intestines may give rise to problems in that the gallbladder may be damaged in the process of removal, which may result in spoiling the liver with gall and incomplete removal of the gallbladder.

SUMMARY OF THE INVENTION

In one exemplary aspect, the present invention includes a conveyor track with carriers, a tissue breaking section, and a gallbladder removal station. Each carrier may be equipped to carry an intestines package taken out of a poultry carcass. The intestines package includes at least a liver, gizzard and gallbladder. The carrier may be equipped to move the intestines package through the tissue breaking section for breaking at least some of the tissue connections in the intestines package below the gallbladder. The carrier may also be equipped to move the intestines package through the gallbladder removal station for removing at least the gallbladder from the remainder of the intestines package. In another exemplary aspect, the invention also relates to a method for processing an intestines package.

One exemplary object of the invention is to counter the problems of the prior art intestines processing system and method for processing an intestines package. Another exemplary object of the invention is to realize further advantages, as will become apparent from the following disclosure.

In one exemplary aspect of the invention, an intestines processing system and method for processing an intestines package are proposed in accordance with one or more of the appended claims. In accordance with the dependencies of the claims, the features discussed herein can be applied independently from each other or cumulative with respect to each other. With cumulative application of the features of the invention it is found that the remaining gallbladders can be reduced to less than 5%.

In a first exemplary embodiment of the invention, the tissue breaking section includes a conveyor roll for conveying the intestines package jointly with the carriers of the conveyor track. The conveyor roll includes an entrance section distant from the gallbladder removal station and an exit section proximate to the gallbladder removal station. The conveyor roll is upward tilting with a first vertical distance from the entrance section to the conveyor track that is larger than a second vertical distance from the exit section to the conveyor track. This provides the advantage that the intestines package enters the intestines processing system at a level wherein sensitive organs such as liver and gizzard are less prone to get damaged. The further processing of the intestines package can securely develop from that point when the package moves towards the exit section proximate to the gallbladder removal station. Suitable tilting of the conveyor roll can be achieved when the entrance section is approximately 30-100 mm, and preferably 60-80 mm below a lowest level of the carriers in the conveyor track, and when the exit section is approximately 2-20 mm, and preferably 5-15 mm below the lowest level of the carriers in the conveyor track.

In another exemplary aspect, it is found appropriate that the conveyor roll has one or more helical ribs for transporting the intestines package when the conveyor roll rotates.

The conveyor roll can be provided with an adjacent and vertically oriented guiding plate leaving a gap between the guiding plate and the conveyor roll for receiving relatively flexible parts of the intestines package that are suspended below relatively inflexible parts of the intestines package, such as the liver and gizzard.

The conveyor roll can also be provided with ribs extending in a longitudinal direction of the conveyor roll. This feature can be applied independent from the other features discussed in this description or in addition thereto. These longitudinal ribs serve to strike along the intestines package while they progress from the entrance section towards the exit section, so as to arrange that at least some tissue connections in the intestines package are broken and a moving apart of organs in the intestines package can be accomplished.

In another exemplary aspect, advantageously the ribs in the longitudinal direction of the conveyor roll can be interrupted by recesses. This prevents that the striking force that is applied on the intestines package will be too severe, which could possibly lead to a complete breaking of tissue connections or even an entire loss of the intestines package.

In still another exemplary aspect, the conveyor roll may be provided with a pitch of the at least one helical rib and is, during use, provided with a rotational speed that causes movement of the intestines package at the height of the conveyor roll towards the exit section that is quicker than the movement of the carriers in the conveyor track. This feature can be applied independent from the other features discussed in this description or in addition thereto. This causes that the intestines package is slightly rotated while it progresses from the entrance section to the exit section, and places the gallbladder in optimal position for removal of the gallbladder in the gallbladder removal station.

The gallbladder removal system may, in an exemplary embodiment, include a set of cooperating pinch-off rollers. This feature can be applied independent from the other features discussed in this description or in addition thereto. The feature avoids damage to the gallbladder which would have to be expected when using a cutting tool as is done in the prior art.

According to another exemplary aspect of the invention, a shielding plate may be provided above the conveyor roll that partly covers the conveyor roll. This feature can be applied independent from the other features discussed in this description or in addition thereto. The organs of the intestines package on top of the shielding plate are can thereby be subjected to forces without damaging the organs in the intestines package, which forces aid in the proper positioning of the gallbladder for the operation in the subsequent gallbladder removal station. In connection therewith it is preferable that, like the conveyor roll, the shielding plate can be upward tilting in a conveying direction of the intestines package.

Suitably the shielding plate can be mounted so as to leave a slit between the shielding plate and the guiding plate, wherein the slit is arranged to enable passing through of relatively flexible parts of the intestines package.

In still another exemplary aspect, the conveyor roll may diverge away from the conveyor track in a conveying direction of the intestines package going towards the gallbladder removal station. This feature can be applied independent from the other features discussed in this description or in addition thereto. This feature stresses the tissue connections in the intestines package while moving in the conveying direction and supports the controlled breaking of such tissue connections with reliable centring of the gallbladder between the cooperating pinch-off rollers of the gallbladder removal system.

As seen in the conveying direction of the intestines package, the gallbladder removal station can be preceded by a lifting plate adjacent to the guiding plate. The lifting plate can support and lift parts of the intestines package that move along the guiding plate. The lifting plate can cause the intestines package to partly rotate and position the gallbladder in relation to the gallbladder removal station.

Effective removal of the gallbladder can be promoted by arranging that the pinch-off rollers of the gallbladder removal station are provided at a mutually different altitude, such that a pinch off roll adjacent to a longitudinal direction of the conveyor roll is arranged lower than a pinch off roll that extends in the longitudinal direction of the conveyor roll.

In another exemplary aspect, the intestines processing system of the invention enables the operation of a method for processing an intestines package where the intestines package includes at least a liver, gizzard, and gallbladder. This exemplary method includes conveying of the intestines package in a conveyor track wherein at least in part tissue in the intestines package is broken prior to removing a gall bladder from the intestines package. The intestines package can be conveyed jointly by a carrier in the conveyor track from which the intestines package can be suspended and by a conveyor roll below the conveyor track. The conveyor roll can be provided with an entrance section and an exit section. The conveyor roll can be upward tilting from the entrance section to the exit section with a first vertical distance from the entrance section to the conveyor track that is larger than a second vertical distance from the exit section to the conveyor track.

In this exemplary method of the invention, the movement of the intestines package with the conveyor roll towards the exit section is preferably slightly quicker than the movement of the carriers in the conveyor track. Part of the intestines package may be lifted prior to removal of the gallbladder so as to cause the intestines package to partly rotate, and to suitably position the intestines package for the removal of the gallbladder.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of an exemplary embodiment of an apparatus according to the invention that is not limiting as to the appended claims.

In the drawing.

Figure 1:
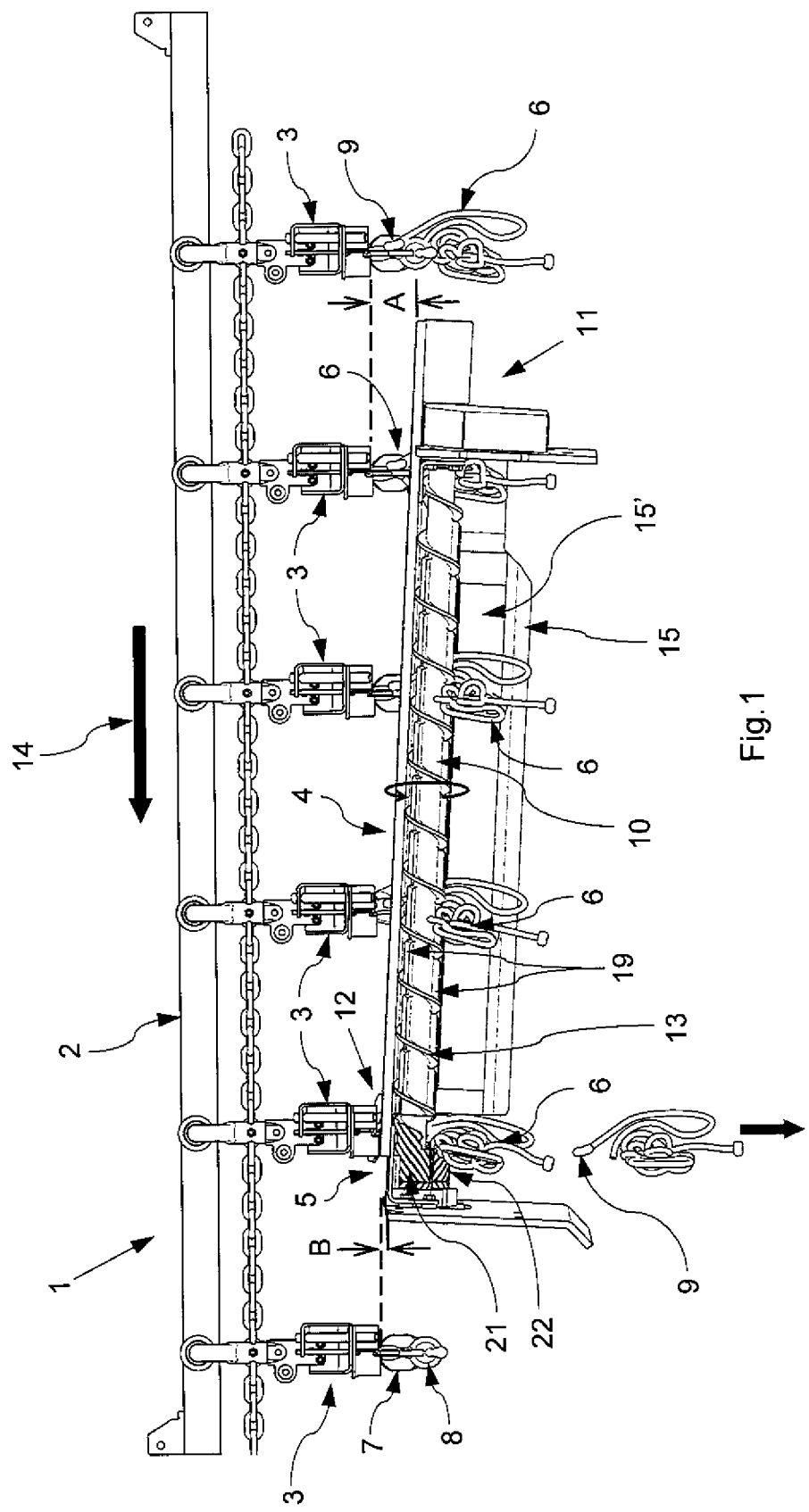
FIG. 1 shows a side view at an exemplary intestines processing system of the invention.
Figure 3:
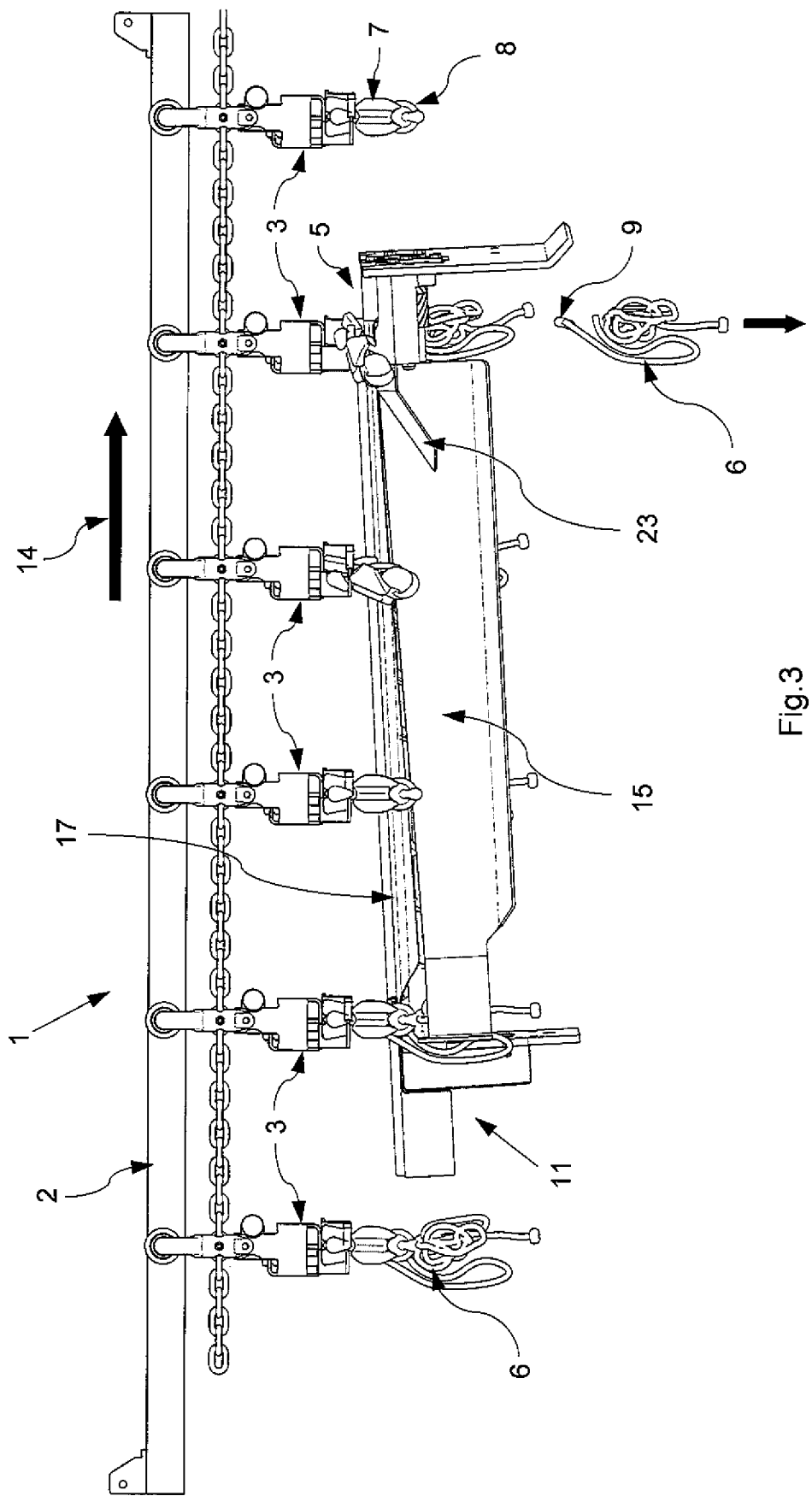
Figure 4:
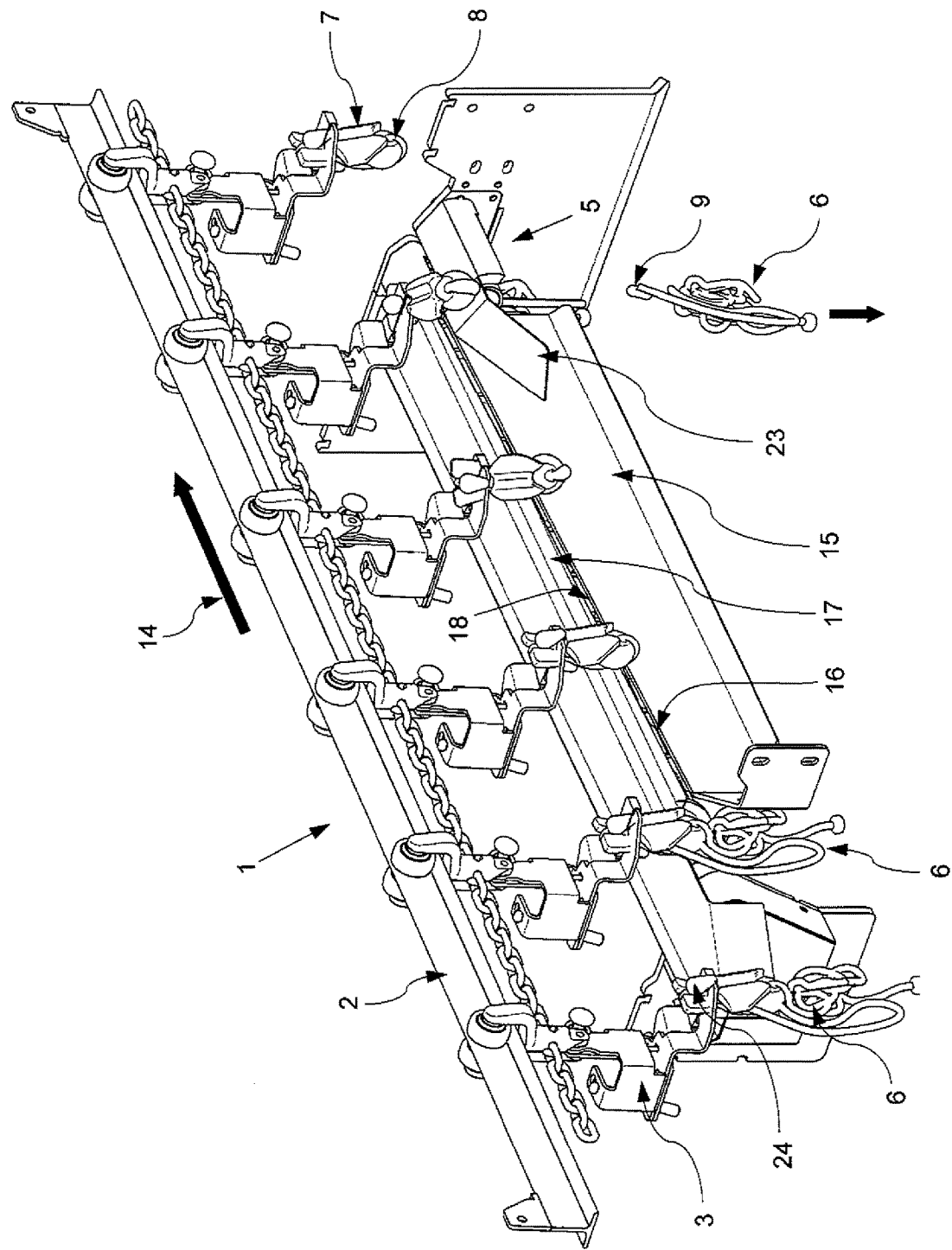
Figure 5:
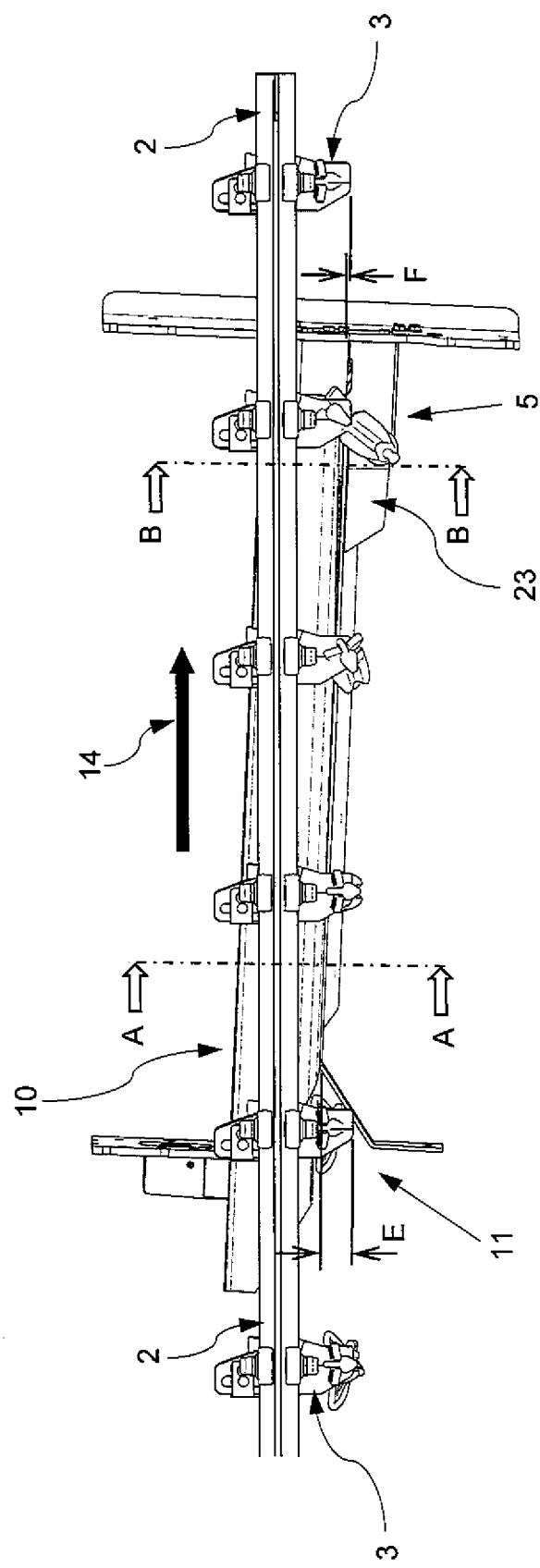
Figure 6:
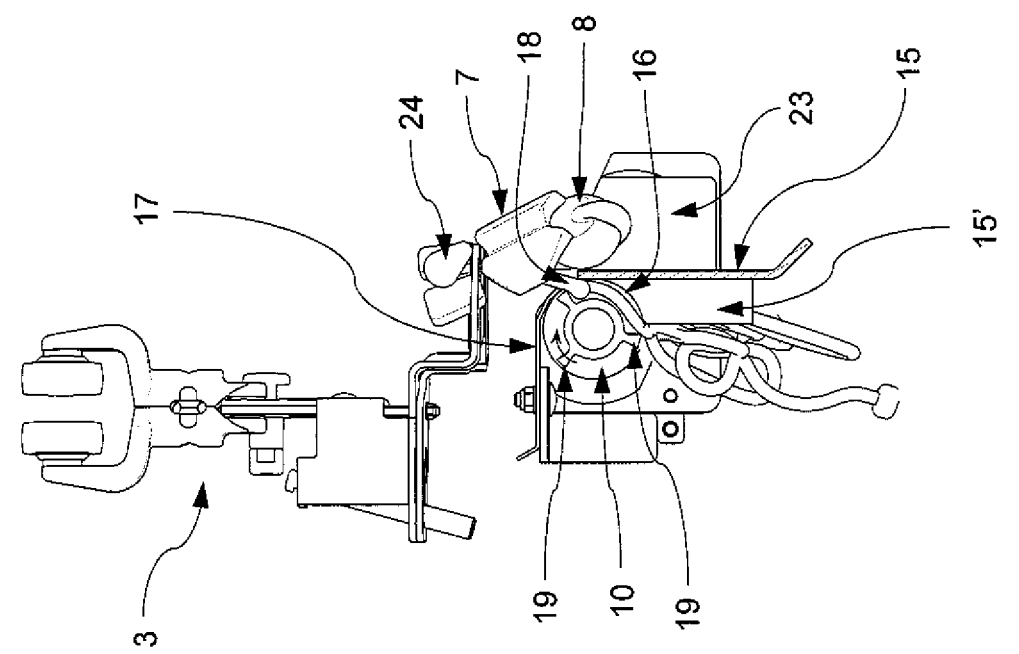

FIG. shows an opposing side view at the exemplary intestines processing system of FIG. 1;

FIG. 4 shows an isometric view of the exemplary intestines processing system of FIG. 3;

FIG. 5 shows a top view of the exemplary intestines processing system of FIG. 3;

FIG. 6 shows a cross-sectional view according to the line A-A in FIG. 5; and

Figure 7:
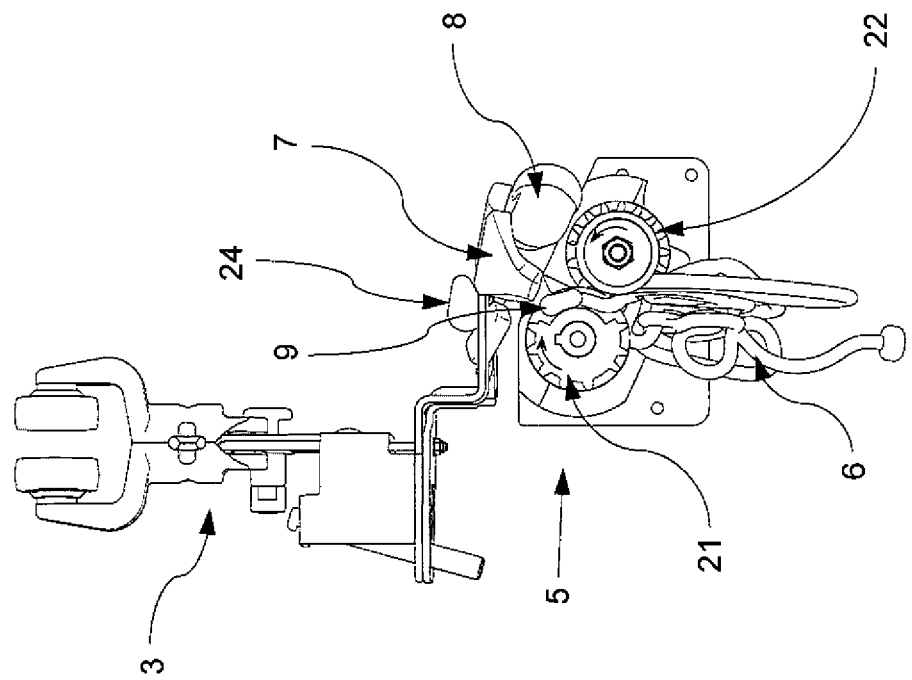

FIG. 7 shows a cross-sectional view according to the line B-B in FIG. 5.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Making reference first to FIG. 1, an intestines processing system 1 according to an exemplary embodiment of the invention is shown in a side view. FIG. 1 shows that the intestines processing system 1 of this embodiment includes a conveyor track 2 with carriers 3, a tissue breaking section 4 and a gallbladder removal station 5. Each carrier 3 is equipped to carry an intestines package 6 taken out of a poultry carcass. As the skilled person knows an intestines package at least comprises a liver 7, a gizzard 8 and a gallbladder 9.

The carrier 3 is equipped to move the intestines package 6 through the tissue breaking section 4 for breaking at least some of the tissue connections in the intestines package 6 below the gallbladder 9. The carrier 3 is also equipped to eventually move the intestines package 6 through the gallbladder removal station 5 for removing at least the gallbladder 9 with possibly some other parts of the remainder of the intestines package 6—as shown with the dropping gallbladder 9 below removal station 5. This is also shown in FIGS. 3 and 4.

According to this exemplary embodiment of the invention, the tissue breaking section 4 includes a conveyor roll 10 with a dual function of conveying the intestines package 6 and breaking tissue connections in the intestines package 6. The conveyor roll 10 conveys the intestines package 6 jointly with the carriers 3 of the conveyor track 2. The conveyor roll 10 has an entrance section 11 distant from the gallbladder removal station 5 and an exit section 12 proximate to the gallbladder removal station 5.

FIG. 1 clearly shows that the conveyor roll 10 for this embodiment is upward tilting with a first vertical distance from the entrance section 11 to the conveyor track 2 that is larger than a second vertical distance from the exit section 12 to the conveyor track 2. This provides the advantage that the intestines package 6 enters the intestines processing system 1 at a level wherein sensitive organs such as liver 7 and gizzard 8 are less prone to get caught by the conveyor roll 10 and thus gets damaged and/or get lost. The further processing of the intestines package 6 develops from that point going towards the exit section 12 proximate to the gallbladder removal station 5. Suitable tilting of the conveyor roll 10 is achieved when the entrance section 11 is approximately 30-100 mm, and preferably 60-80 mm (parameter A) below a lowest level of the carriers 3 in the conveyor track 2, and when the exit section 12 is approximately 2-20 mm, and preferably 5-15 mm (parameter B) below the lowest level of the carriers 3 in the conveyor track 2.

Figure 2:
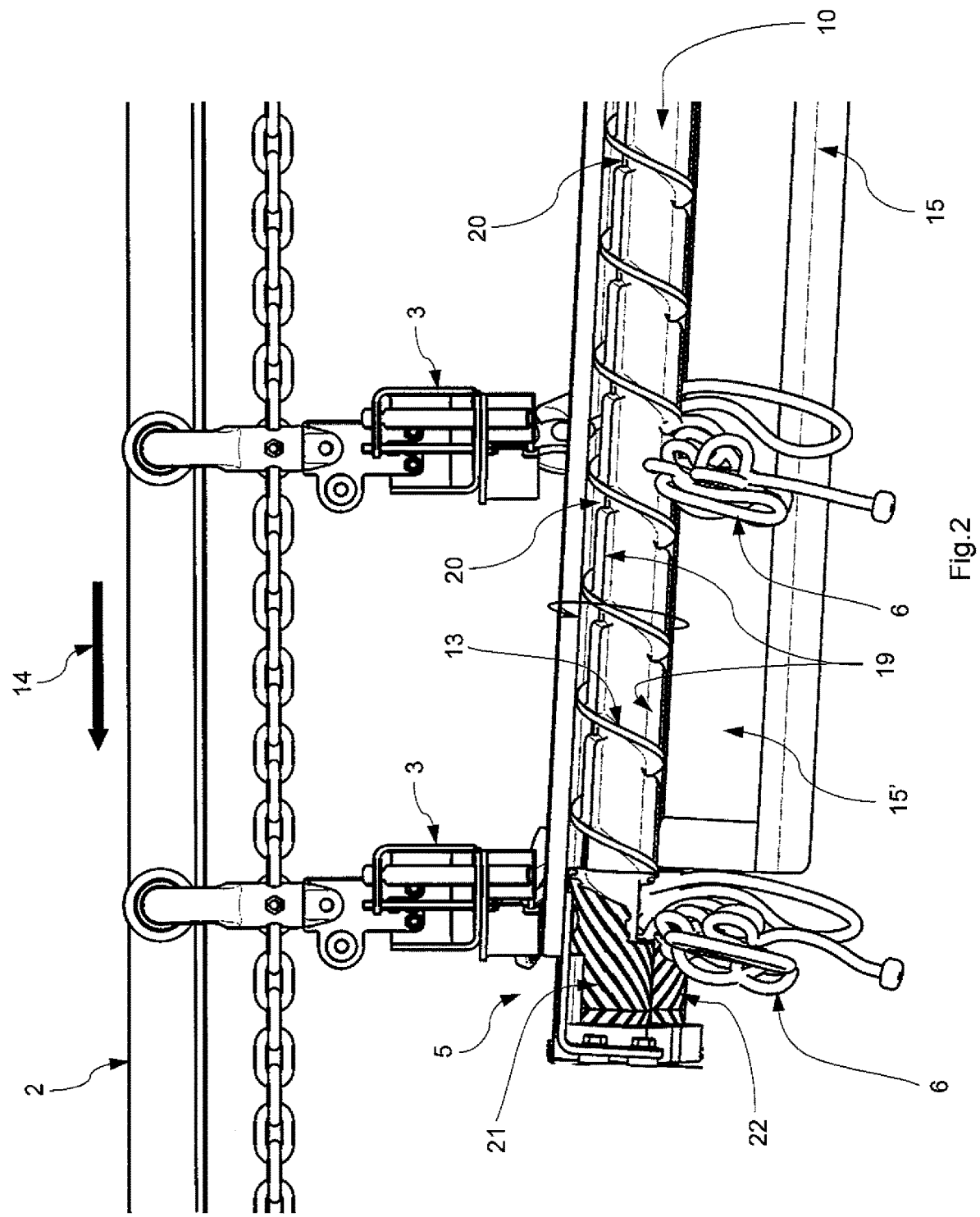
FIG. 2 shows a detail view of the exemplary intestines processing system of FIG. 1.

FIG. 1 and the detail of FIG. 2 show that the conveyor roll 10 has at least one helical rib 13 that is used for transporting the intestines package 6 by rotating the conveyor roll 10. Transportation of the intestines package 6 then occurs in the direction of arrow 14. The conveyor roll 10 is provided with a pitch of the at least one helical rib 13 and can be, during use, provided with a rotational speed that causes movement of the intestines package 6 at the height of the conveyor roll 10 towards the exit section 12, which occurs at a higher speed than the movement of the carriers 3 in the conveyor track 2. Using the teachings disclosed herein, the skilled person is knowledgeable on the selection of the pitch and the required rotational speed of the conveyor roll 10 to realize this objective, so that further elucidation is superfluous.

FIG. 1 and in particular the detail of FIG. 2 show that the conveyor roll 10 is provided with an adjacent and vertically oriented guiding plate 15. The vertical orientation of the guiding plate 15 is particularly clear when also looking at FIG. 3, which shows the exemplary intestines processing system 1 from the side that is opposite to what is shown in FIG. 1 and FIG. 2. In FIG. 3 the guiding plate 15 blocks sight at the conveyor roll 10.

The isometric view of FIG. 4 shows that there is a gap 16 between the guiding plate 15 and the conveyor roll 10 that receives the relatively flexible parts of the intestines package 6 that are suspended below the relatively inflexible parts of the intestines package, such as the liver 7 and gizzard 8. It is to be noted that FIG. 4 does not provide a clear view at the conveyor roll 10, since a shielding plate 17 is provided above the conveyor roll 10 that partly covers the conveyor roll 10. The shielding plate 17 is mounted so as to leave a slit 18 between the shielding plate 17 and the guiding plate 15, wherein the slit 18 enables to pass through the relatively flexible parts of the intestines package 6. These flexible parts of the intestines package 6 lower than further into the earlier mentioned gap 16 between the guiding plate 15 and the conveyor roll 10.

Consistent with the conveyor roll 10 also the shielding plate 17 is upward tilting in a conveying direction of the intestines package 6. In the top view at the exemplary intestine processing system 1 of the invention provided by FIG. 5, it is shown that the conveyor roll 10 diverges away from the convey- or track 2 in a conveying direction 14 of the intestines pack-age going towards the gallbladder removal station 5.

FIG. 6 shows a cross-sectional view according to the line A-A in FIG. 5 showing more clearly the shielding plate 17 above the conveyor roll 10 that partly covers the conveyor roll 10. FIG. 6 also shows the position of the guiding plate 15 and an adjacent guiding block 15' next to the guiding plate 15, which forces the flexible parts of the intestines package 6 in an appropriate position through the slit 18 between the shielding plate 17 and the guiding plate 15, and through the gap 16 between the guiding plate 15 and the conveyor roll 10.

In FIG. 6 but also in FIGS. 1 and 2 it is shown that the conveyor roll 10 is provided with ribs 19 extending in a longitudinal direction of the conveyor roll 10. These longitudinal ribs 19 serve to strike along the intestines package 6 while it progresses from the entrance section 11 towards the exit section 12, so as to arrange that at least some tissue connections in the intestines package 6 are broken and a slight moving apart of organs in the intestines package 6 can be accomplished. Preferably the ribs 19 in the longitudinal direction of the conveyor roll 10 are interrupted by recesses 20 as most clearly shown in FIG. 2. This prevents that the striking force that is applied on the intestines package 6 will become too severe, which could possibly lead to a complete breaking of tissue connections or even an entire loss of the intestines package 6.

Making now reference to FIG. 7 a cross-sectional view is provided according to the line B-B in FIG. 5. It shows the pinch off rollers 21, 22 of the gallbladder removal station 5, which are also shown in FIGS. 1 and 2. Pinch off roll 21 extends in the longitudinal direction of the conveyor roll 10, whereas pinch off roll 22 is shifted aside with reference to the conveyor roll 10. The pinch-off rollers 21, 22 of the gallbladder removal station 5 can be provided at a mutually different altitude, in particular the pinch off roll 22 adjacent to the longitudinal direction of the conveyor roll 10 is provided lower than the pinch off roll 21 that extends in the longitudinal direction of the conveyor roll 10. In connection therewith, FIGS. 3 and 4 further show that the gallbladder removal station 5 is preceded by a lifting plate 23 adjacent to the guiding plate 15, wherein the lifting plate 23 supports and lifts parts of the intestines package 6, in particular the liver 7 and the gizzard 8 that move along the guiding plate 15, by which measure the lifting plate 23 causes the intestines package 6 to partly rotate and suitably position the gallbladder 9 in relation to the pinch off rollers 21, 22 of the gallbladder removal station 5. For reference purpose FIG. 7 also shows the heart 24 taken out from a poultry carcass as part of the intestines package 6.

Although the invention has been discussed in the foregoing with reference to an exemplary embodiment of the intestines processing system and method for processing an intestines package according to the invention, the invention is not restricted to this particular embodiment which can be varied in many ways without departing from the invention. The dis-cussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. An intestines processing system, comprising:
   a conveyor track with carriers, each carrier equipped to carry an intestines package taken out of a poultry carcass, the intestines package comprising a liver, gizzard, and gallbladder;
   a tissue breaking section, each carrier equipped to move the intestines package through the tissue breaking section for breaking at least some tissue connections in the intestines package below the gallbladder; and
   a gallbladder removal station, each carrier equipped to move the intestines package through the gallbladder removal station for removing at least the gallbladder from a remainder of the intestines package;
   wherein the tissue breaking section comprises a conveyor roll for conveying the intestines package jointly with the carriers of the conveyor track, wherein the conveyor roll has an entrance section distant from the gallbladder removal station and an exit section proximate to the gallbladder removal station, wherein the conveyor roll is upward tilting with a first vertical distance from the entrance section to the conveyor track that is larger than a second vertical distance from the exit section to the conveyor track.

2. The intestines processing system according to claim 1, wherein the conveyor roll comprises one or more helical ribs for transporting the intestines package.

3. The intestines processing system according to claim 1, wherein the conveyor roll is provided with an adjacent and vertically oriented guiding plate leaving a gap between the guiding plate and the conveyor roll for receiving relatively flexible parts of the intestines package that are suspended below relatively inflexible parts of the intestines package, such as the liver and gizzard.

4. The intestines processing system according to claim 1, wherein the conveyor roll is provided with ribs extending in a longitudinal direction of the conveyor roll.

5. The intestines processing system according to claim 4, wherein the ribs in the longitudinal direction of the conveyor roll are interrupted by recesses.

6. The intestines processing system according to claim 1, wherein the conveyor roll is provided with a pitch of the at least one helical rib and is during use provided with a rotational speed that causes movement of the intestines package at the height of the conveyor roll towards the exit section at a higher speed than movement of the carriers in the conveyor track.

7. The intestines processing system according to claim 1, wherein the gallbladder removal station comprises a set of cooperating pinch-off rollers.

8. The intestines processing system according to claim 1, wherein the shielding plate is provided above the conveyor roll that partly covers the conveyor roll.

9. The intestines processing system according to claim 8, wherein the shielding plate is mounted so as to leave a slit between the shielding plate and the guiding plate, wherein the slit enables passing therethrough relatively flexible parts of the intestines package.

10. The intestines processing system according to claim 9, wherein the shielding plate is upward tilting in a conveying direction of the intestines package.

11. The intestines processing system according to the preamble of claim 1, wherein the conveyor roll diverges away from the conveyor track in a conveying direction of the intestines package going towards the gallbladder removal station.

12. The intestines processing system according to claim 11, wherein the gallbladder removal station is preceded by a lifting plate adjacent to the guiding plate, wherein the lifting plate supports and lifts parts of the intestines package that move along the guiding plate, wherein the lifting plate causes the intestines package to partly rotate and position the gallbladder in relation to the gallbladder removal station.

13. The intestines processing system according to claim 12, wherein the pinch-off rollers of the gallbladder removal station are provided at a mutually different altitude with a pinch off roll adjacent to a longitudinal direction of the conveyor roll being lower than a pinch off roll that extends in the longitudinal direction of the conveyor roll.

14. A method for processing an intestines package, the intestines package comprising a liver, gizzard, and gallbladder, the method comprising:
   conveying the intestines package in a conveyor track wherein at least in part tissue in the intestines package is broken prior to removing at least a gall bladder from the intestines package;
   conveying the intestines package jointly by a carrier in the conveyor track from which the intestines package is suspended and by a conveyor roll below the conveyor track; and
   providing the conveyor roll with an entrance section and an exit section, wherein the conveyor roll is upward tilting from the entrance section to the exit section with a first vertical distance from the entrance section to the conveyor track that is larger than a second vertical distance from the exit section to the conveyor track.

15. The method for processing an intestines package according to claim 14, further comprising providing the conveyor roll with an adjacent and vertically oriented guiding plate leaving a gap between the guiding plate and the conveyor roll for receiving relatively flexible parts of the intestines package that are suspended below relatively inflexible parts of the intestines package, such as the liver and gizzard.

16. The method for processing an intestines package according to claim 14, further comprising providing one or more helical ribs on the conveyor roll, providing the conveyor roll with ribs extending in a longitudinal direction of the conveyor roll, or both.

17. The method for processing an intestines package according to claim 14, further comprising providing the ribs in the longitudinal direction of the conveyor roll with recesses.

18. The method for processing an intestines package according to claim 14, further comprising moving the intestines package with the conveyor roll at the level of the conveyor roll at a higher speed towards the exit section than the movement of the carriers in the conveyor track.

19. The method for processing an intestines package according to claim 14, further comprising removing the gallbladder with a set of cooperating pinch-off rollers.

20. The method for processing an intestines package according to claim 14, further comprising providing a shielding plate above the conveyor roll which is upward tilting in a conveying direction of the intestines package.

21. The method for processing an intestines package according to claim 14, further comprising diverging the conveyor roll away from the conveyor track as seen in a conveying direction of the intestines package.

22. The method for processing an intestines package according to claim 14, further comprising lifting part of the intestines package prior to removal of the gallbladder so as to cause the intestines package to partly rotate and to suitably position the gallbladder for its removal.

\* \* \* \* \*